US007240080B2

(12) United States Patent
Micka et al.

(10) Patent No.: US 7,240,080 B2
(45) Date of Patent: Jul. 3, 2007

(54) METHOD AND APPARATUS FOR DETERMINING USING LEAST RECENTLY USED PROTOCOL IF ONE OR MORE COMPUTER FILES SHOULD BE WRITTEN TO ONE OR MORE INFORMATION STORAGE MEDIA AND SYNCHRONOUSLY PROVIDING ONE OR MORE COMPUTER FILES BETWEEN FIRST AND STORAGE DEVICES

(75) Inventors: William F. Micka, Tucson, AZ (US);
Sam C. Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 10/630,603

(22) Filed: Jul. 30, 2003

(65) Prior Publication Data

US 2005/0027737 A1    Feb. 3, 2005

(51) Int. Cl.
*G06F 17/30* (2006.01)
*G06F 7/00* (2006.01)
(52) U.S. Cl. .......................... 707/204; 707/1; 707/200
(58) Field of Classification Search ................ 707/1–3, 707/100–104.1, 200–205; 711/160–165; 714/6–7, 2, 12–13; 709/302, 210–2
See application file for complete search history.

(56) References Cited

U.S. PATENT DOCUMENTS 5,333,312 A     7/1994  Wang .......................... 395/600
5,440,727 A     8/1995  Bhide et al. ................. 395/444
5,446,871 A  *  8/1995  Shomler et al. ................ 714/1
5,555,371 A  *  9/1996  Duyanovich et al. ......... 714/13

(Continued)

FOREIGN PATENT DOCUMENTS

WO     WO 96/23259       *  8/1996
WO     WO 2006/069783    *  8/2005

OTHER PUBLICATIONS

Kai Hwang et al. "Orthogonal striping and mirroring in distrubuted RAID for I/O-centric cluster computing", IEEE transactiions on parallel and distributed systems, vol. 13, No. 1 Jan. 2002, pp. 26-44.*

(Continued)

*Primary Examiner*—Srirama Channavajjala
(74) *Attorney, Agent, or Firm*—Chandler & Udall, LLP; Dale F. Regelman (57) ABSTRACT

A method to copy information to two data storage devices. The method provides a first data storage device and a second data storage device, where the first data storage device is capable of communicating with the second data storage device. The method provides first information and a write command to the first data storage device at a first time. The method determines if the write command comprises a synchronous copy attribute. If the write command comprises a synchronous copy attribute, then the method synchronously provides the first information to the second data storage device. Alternatively, if the write command does not comprise a synchronous copy attribute, then the method provides the first information to the second data storage device at a second time, where that second time is later than the first time.

7 Claims, 5 Drawing Sheets

U.S. PATENT DOCUMENTS

| | | | |
|---|---|---|---|
| 5,592,618 A * | 1/1997 | Micka et al. | 714/54 |
| 5,657,440 A * | 8/1997 | Micka et al. | 714/16 |
| 5,680,580 A | 10/1997 | Beardsley et al. | 395/489 |
| 5,734,818 A * | 3/1998 | Kern et al. | 714/20 |
| 5,742,792 A | 4/1998 | Yanai et al. | 395/489 |
| 5,819,296 A * | 10/1998 | Anderson et al. | 707/204 |
| 5,875,479 A | 2/1999 | Blount et al. | 711/162 |
| 5,889,935 A * | 3/1999 | Ofek et al. | 714/6 |
| 5,937,414 A | 8/1999 | Souder et al. | 707/203 |
| 6,088,697 A | 7/2000 | Crockett et al. | 707/10 |
| 6,148,383 A | 11/2000 | Micka et al. | 711/162 |
| 6,173,377 B1 * | 1/2001 | Yanai et al. | 711/162 |
| 6,286,085 B1 | 9/2001 | Jouenne et al. | 711/162 |
| 6,324,654 B1 | 11/2001 | Wahl et al. | 714/6 |
| 6,327,671 B1 | 12/2001 | Menon | 714/6 |
| 6,587,933 B2 * | 7/2003 | Crockett et al. | 711/154 |
| 6,643,671 B2 * | 11/2003 | Milillo et al. | 707/204 |
| 6,754,792 B2 * | 6/2004 | Nakamura et al. | 711/162 |
| 6,789,178 B2 * | 9/2004 | Mikkelsen et al. | 711/167 |
| 6,915,316 B1 * | 7/2005 | Patterson et al. | 707/204 |
| 6,948,009 B2 * | 9/2005 | Jarvis et al. | 710/17 |
| 6,950,915 B2 * | 9/2005 | Ohno et al. | 711/162 |
| 6,978,347 B2 * | 12/2005 | Nakamura et al. | 711/114 |
| 6,978,397 B2 * | 12/2005 | Chan | 714/12 |
| 6,981,008 B2 * | 12/2005 | Tabuchi et al. | 707/204 |
| 7,127,636 B2 * | 10/2006 | Werner et al. | 714/6 |
| 7,130,974 B2 * | 10/2006 | Iwamura et al. | 711/162 |
| 7,152,078 B2 * | 12/2006 | Yamagami | 707/204 |
| 2002/0133512 A1 * | 9/2002 | Milillo et al | 707/204 |
| 2003/0229764 A1 * | 12/2003 | Ohno et al. | 711/147 |
| 2004/0139128 A1 * | 7/2004 | Becker et al. | 707/204 |
| 2004/0143563 A1 * | 7/2004 | Saake et al. | 707/1 |
| 2004/0254964 A1 * | 12/2004 | Kodama et al. | 707/204 |
| 2004/0260899 A1 * | 12/2004 | Kern et al. | 711/162 |
| 2005/0071380 A1 * | 3/2005 | Micka et al. | 707/200 |
| 2005/0071393 A1 * | 3/2005 | Ohno et al. | 707/204 |
| 2006/0195670 A1 * | 8/2006 | Iwamura et al. | 711/162 |

OTHER PUBLICATIONS

Yijian Wang et al. "Load balancing using grid-based peer-to-peer parallel I/O", IEEE international conference on Cluster computing Sep. 2005.*

Minwen Ji, et al. "Seneca: remote mirroring done write", Proceedings of USENIX technical conference, Jun. 2003, pp. 253-268.*

Athicha Muthitacharoen et al. "Ivy: a read/write peer-to-peer file system", proceedings of the 5th symposoum on operating systems design and implementation, 2002, pp. 31-44.*

Neil E Ervin: "Managing extended distance EMC SRDF semi-synchronous remote copy", technical support, Aug. 1999.*

H Pat Artis, "understanding the performance characteristics of synchronous remote copy", 1997 performance associates, Inc.*

Yitzhak Dishon et al. "disk dual copy methods and their performance", eithteenth international symposium on fault-tolerant computing, 1998, pp. 314-319.*

Philipp Reisner, "DRBD Distributed replicated block device", Aug. 12, 2002 pp. 1-9.*

Keith Bell et al. "a high-performance cluster storage server", proceedings of the 11th IEEE internatinal symposium on high performance distributed computing HPDC-11, 2002.*

Dean Hildebrand et al. "Large files, small writes, and pNFS", CITI Technical report 06-04, May 10, 2006.*

* cited by examiner

METHOD AND APPARATUS FOR DETERMINING USING LEAST RECENTLY USED PROTOCOL IF ONE OR MORE COMPUTER FILES SHOULD BE WRITTEN TO ONE OR MORE INFORMATION STORAGE MEDIA AND SYNCHRONOUSLY PROVIDING ONE OR MORE COMPUTER FILES BETWEEN FIRST AND STORAGE DEVICES

FIELD OF THE INVENTION

This invention relates to an apparatus and method to provide information to multiple data storage devices. More specifically, the invention is directed to storing computer files on multiple information storage media.

BACKGROUND OF THE INVENTION

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA) typically includes one or more read/write heads, and is provided in each DASD for moving across the tracks to transfer the data to and from the surface of the disks as the disks are rotated past the read/write heads. DASDs can store gigabytes of data, and the access to such data is typically measured in milliseconds (orders of magnitudes slower than electronic memory). Access to data stored on DASD is slower than electronic memory due to the need to physically position the disk and HDA to the desired data storage location.

Having a backup data copy is mandatory for many businesses for which data loss would be catastrophic. The time required to recover lost data is also an important recovery consideration. With tape or library backup, primary data is periodically backed-up by making a copy on tape or library storage. One improvement over this arrangement is "flash copy," which mirrors contents of a primary device with a nearly identical secondary device. An example flash copy involves providing additional DASDs so that data is written to the additional DASDs substantially in real time along with the primary DASDs. Then, if the primary DASDs fail, the secondary DASDs can be used to provide otherwise lost data. A drawback to this approach is that the number of required DASDs is doubled.

A different data backup alternative that avoids the need to provide double the storage devices involves writing data to a redundant array of inexpensive devices (RAID). In this configuration, the data is apportioned among many DASDs. If a single DASD fails, then the lost data can be recovered by applying error correction procedures to the remaining data. Several different RAID configurations are available.

The foregoing backup solutions are generally sufficient to recover data in the event that a storage device or medium fails. These backup methods are useful only for device failures since the secondary data is a mirror of the primary data, that is, the secondary data has the same volume serial numbers (VOLSERs) and DASD addresses as the primary data. Data recovery due to system failures or storage controller failures, on the other hand, is not available using mirrored secondary data. Hence still further protection is required for recovering data if the entire system or even the site is destroyed by a disaster such as an earthquake, fire, explosion, hurricane, etc. Disaster recovery requires that the secondary copy of data be stored at a location remote from the primary data. A known method of providing disaster protection is to periodically backup data to tape, such as a daily or weekly basis. The tape is then picked up by a vehicle and taken to a secure storage area usually located kilometers from the primary data location. Nonetheless, this backup plan has its problems. First, it may take days to retrieve the backup data, and additional data is lost waiting for the backup data to be recovered. Furthermore, the same disaster may also destroy the storage location. A slightly improved backup method transmits data to a backup location each night. This allows the data to be stored at a more remote location. Again, some data may be lost between backups since backups do not occur continuously, as in the dual copy solution. Hence, a substantial amount of data may still be lost and this may be unacceptable to some users.

More recently introduced data disaster recovery solutions include "remote dual copy," where data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers. The secondary or remote location, in addition to providing a backup data copy, must also have enough system information to take over processing for the primary system should the primary system become disabled. This is due in part because a single storage controller does not write data to both primary and secondary DASD storage at the primary and secondary sites. Instead, the primary data is stored on a primary DASD storage attached to a primary storage controller while the secondary data is stored on a secondary DASD storage attached to a secondary storage controller.

The secondary site must not only be sufficiently remote from the primary site, but must also be able to backup primary data in real time. The secondary site needs to backup primary data in real time as the primary data is updated, with some minimal delay. Additionally, the secondary site has to backup the primary data regardless of the application program (e.g., IMS, DB2) running at the primary site and generating the data and/or updates. A difficult task required of the secondary site is that the secondary data must be "order consistent," that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

Remote data duplexing falls into two general categories, synchronous and asynchronous. Synchronous remote copy involves sending primary data to the secondary location and confirming the reception of such data before ending a primary DASD input/output (I/O) operation. Synchronous copy, therefore, slows the primary DASD I/O response time while waiting for secondary confirmation. Primary I/O response delay is increased proportionately with the distance between the primary and secondary systems, a factor that limits the remote distance to tens of kilometers. Synchronous copy, however, provides sequentially consistent data at the secondary site with relatively little system overhead.

In contrast to synchronous remote copy, asynchronous remote copy provides better primary application system performance because the primary DASD I/O operation is completed without waiting for data to be confirmed at the secondary site. Therefore, the primary DASD I/O response time is not dependent upon the distance to the secondary site and the secondary site can be thousands of kilometers remote from the primary site.

What is needed is a method that can implement a synchronous copy mode where that mode is required, but which can implement an asynchronous copy mode otherwise. Applicants' invention comprises such a method.

SUMMARY OF THE INVENTION

Applicants' invention includes a method to provide information to multiple data storage devices. The method provides a first data storage device and a second data storage device, where the first data storage device is capable of communicating with the second data storage device. The method provides first information and second information to the first data storage device at a first time. In certain embodiments, the second information comprises a write command. The method determines if the second information comprises a synchronous copy attribute.

If the second information comprises a synchronous copy attribute, then the method synchronously provides the first information to the second data storage device. Alternatively, if the second information does not comprise a synchronous copy attribute, then the method provides the first information to the second data storage device at a second time, where that second time is later than the first time.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
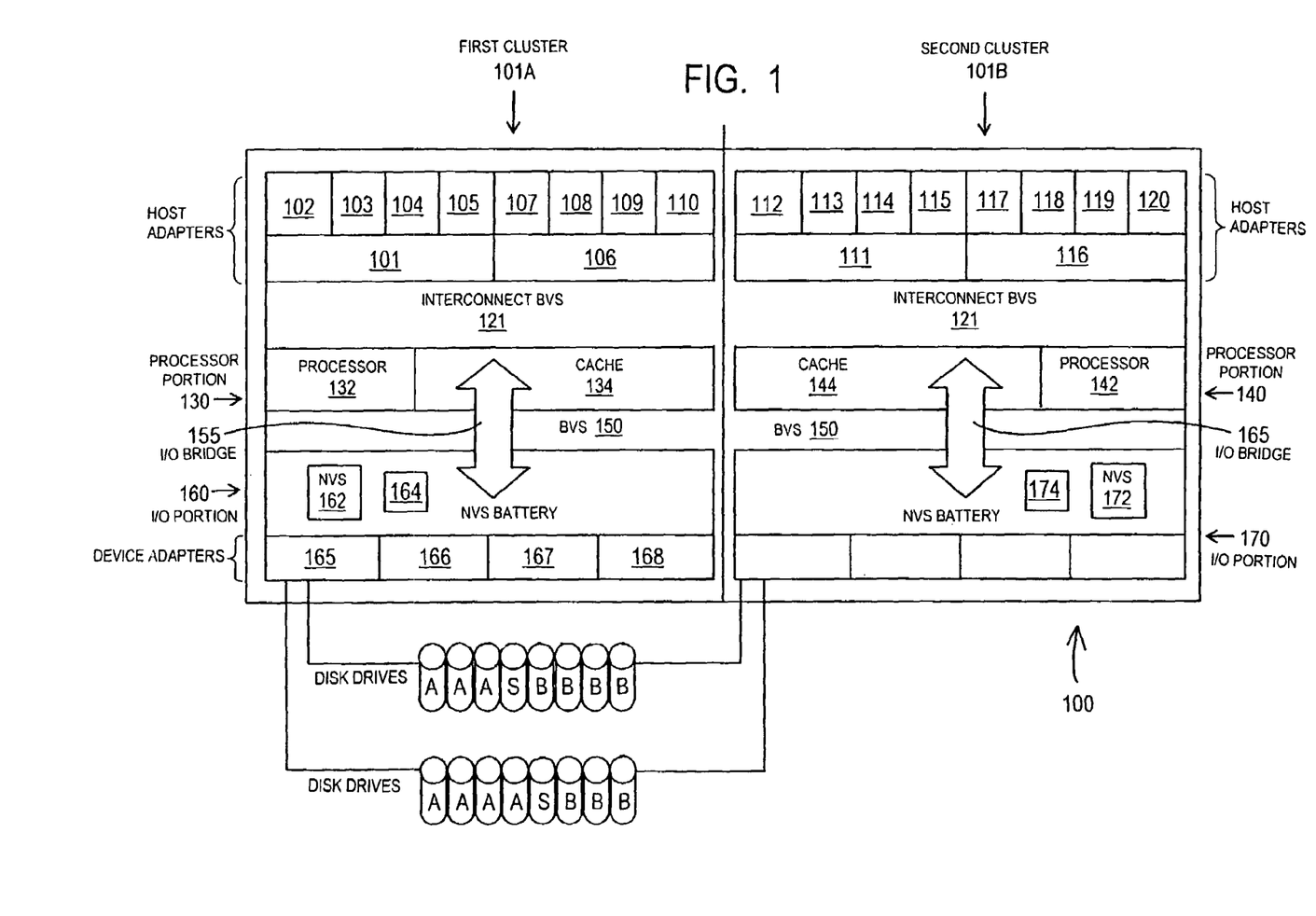
FIG. 1 is a block diagram showing the components of Applicants' data storage and retrieval system.

This invention is described in preferred embodiments in the following description with reference to the Figures, in which like numbers represent the same or similar elements. Referring now to FIG. 1. Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one Fibre Channel port, one FICON port, two ESCON ports, or two SCSI ports. Each host adapter is connected to both clusters through one or more Common Platform Interconnect buses 121 and 150 such that each cluster can handle I/O from any host adapter.

Processor portion 130 includes processor 132 and cache 134. In certain embodiments, processor 132 comprises a 64-bit RISC based symmetric multiprocessor. In certain embodiments, processor 132 includes built-in fault and error-correction functions. Cache 134 is used to store both read and write data to improve performance to the attached host systems. In certain embodiments, cache 134 comprises about 4 gigabytes. In certain embodiments, cache 134 comprises about 8 gigabytes. In certain embodiments, cache 134 comprises about 12 gigabytes. In certain embodiments, cache 144 comprises about 16 gigabytes. In certain embodiments, cache 134 comprises about 32 gigabytes.

Processor portion 140 includes processor 142 and cache 144. In certain embodiments, processor 142 comprises a 64-bit RISC based symmetric multiprocessor. In certain embodiments, processor 142 includes built-in fault and error-correction functions. Cache 144 is used to store both read and write data to improve performance to the attached host systems. In certain embodiments, cache 144 comprises about 4 gigabytes. In certain embodiments, cache 144 comprises about 8 gigabytes. In certain embodiments, cache 144 comprises about 12 gigabytes. In certain embodiments, cache 144 comprises about 16 gigabytes. In certain embodiments, cache 144 comprises about 32 gigabytes.

I/O portion 160 includes non-volatile storage ("NVS") 162 and NVS batteries 164. NVS 162 is used to store a second copy of write data to ensure data integrity should there be a power failure of a cluster failure and the cache copy of that data is lost. NVS 162 stores write data provided to cluster 101B. In certain embodiments, NVS 162 comprises about 1 gigabyte of storage. In certain embodiments, NVS 162 comprises four separate memory cards. In certain embodiments, each pair of NVS cards has a battery-powered charging system that protects data even if power is lost on the entire system for up to 72 hours.

I/O portion 170 includes NVS 172 and NVS batteries 174. NVS 172 stores write data provided to cluster 101A. In certain embodiments, NVS 172 comprises about 1 gigabyte of storage. In certain embodiments, NVS 172 comprises four separate memory cards. In certain embodiments, each pair of NVS cards has a battery-powered charging system that protects data even if power is lost on the entire system for up to 72 hours.

In the event of a failure of cluster 101B, the write data for the failed cluster will reside in the NVS 162 disposed in the surviving cluster 101A. This write data is then destaged at high priority to the RAID ranks. At the same time, the surviving cluster 101A will begin using NVS 162 for its own write data thereby ensuring that two copies of write data are still maintained.

I/O portion 160 further comprises a plurality of device adapters, such as device adapters 165, 166, 167, and 168, and sixteen disk drives organized into two RAID ranks, namely RAID rank "A" and RAID rank "B". In certain embodiments, RAID ranks "A" and "B" utilize a RAID 5 protocol. In certain embodiments, RAID ranks "A" and "B" utilize a RAID 10 protocol.

Figure 2:
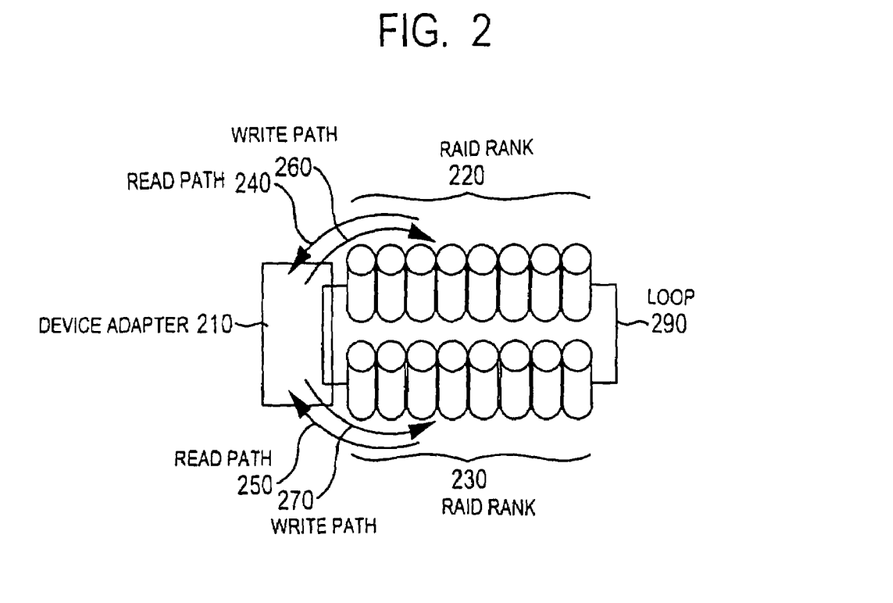
FIG. 2 is a block diagram showing a device adapter in combination with two RAID ranks.

Referring now to FIG. 2, SSA is a full-duplex loop-based architecture, with two physical read paths, i.e. read paths 240 and 250, and two physical write paths, i.e. write paths 260 and 270, to every disk drive attached to the loop. Device adapter 210 is interconnected with RAID rank 220 and RAID rank 230 by loop 290. Data is sent from adapter card 210 to the first disk drive on the loop and then passed around the loop by the disk drives until it arrives at a target disk. Unlike bus-based architectures which reserve the entire bus for data transfer, SSA uses only the part of the loop between adjacent disk drives for data transfer. Therefore, many simultaneous data transfers can take place on an SSA loop.

Figure 3:
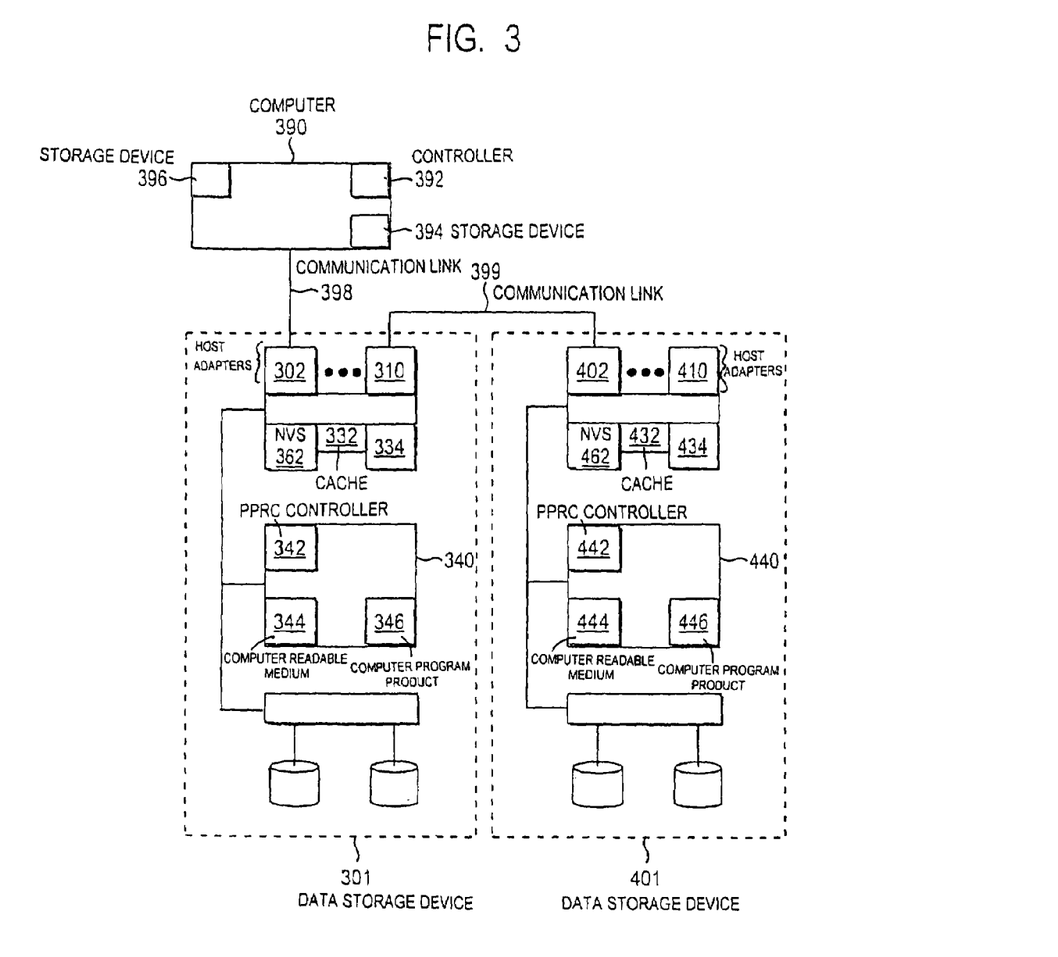
FIG. 3 is a block diagram showing a host computer, a first data storage device, and a second data storage device.
Figure 4A:
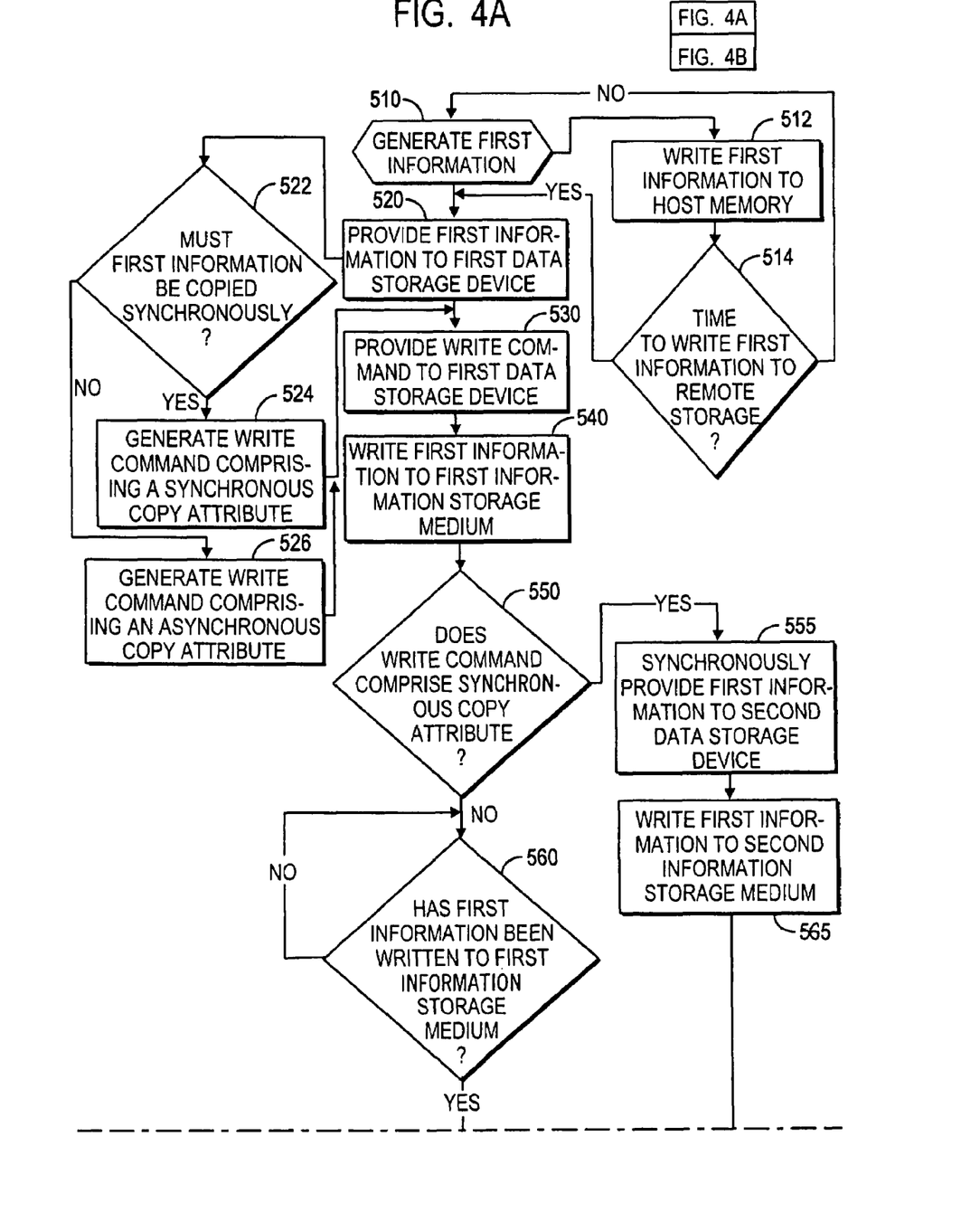
FIG. 4A is a flow chart summarizing certain steps in Applicants' method.

Applicants' invention includes a method to copy information to two or more information storage media. Applicants' method comprises what is sometimes called a "peer to peer remote copy," or PPRC, operation. Referring now to FIGS. 3 and 4A, in step 510 Applicants' method generates one or more computer files, i.e. collectively "first information."

In certain embodiments, Applicants' first information comprises all or portions of one or more database files. In certain embodiments, Applicants' first information comprises one or more updates for one or more database files. In certain embodiments, Applicants' first information comprises one or more log files, wherein those one or more log file comprise information relating to one or more database files. In certain embodiments, Applicants' first information comprises updates for one or more log files.

In certain embodiments, step 510 is performed by a computer, such as computer 390. In certain embodiments, computer 390 comprises a personal computer. In certain embodiments, computer 390 comprises a work station. In certain embodiments, computer 390 comprises a main frame computer. In certain embodiments, computer 390 comprises a computer system comprising two or more computers, wherein those two or more computers include zero or more personal computers, zero or more work stations, and zero or more main frame computers. In certain embodiments, Applicants' method transitions from step 510 to step 520.

In certain embodiments, Applicants' method includes step 512 wherein Applicants' method writes the first information to a memory device, such as memory device 394 disposed in computer 390. In certain embodiments, computer 390 includes a controller 392. In certain embodiments, step 512 is performed by controller 392. In certain embodiments, one or more data base files, one or more database updates, one or more log files, one or more log file updates, and combinations thereof are stored on device 396.

In certain embodiments, Applicants' method includes step 514 wherein Applicants' method determines if the first information should be immediately written to one or more information storage media. In certain embodiments, step 514 is performed by a controller, such as controller 392. In certain embodiments, step 514 includes using least recently used ("LRU") file management protocol wherein one or more of the least recently used files are written to one or more data storage devices, such as data storage devices 301 and 302, and then removed from resident memory, such as memory device 394 and/or 396.

If Applicants' method determines in step 514 that the first information should be immediately written to one or more information storage media, then Applicants' method transitions from step 514 to step 520. Alternatively, if Applicants' method determines that the first information should not be immediately written to one or more information storage media, then Applicants' method transitions from step 514 to step 510 and continues.

In step 520, Applicants' method provides the first information to a first data storage device. In certain embodiments, the first data storage device comprises a data storage and retrieval system, such as system 100 (FIG. 1). In certain embodiments, the first data storage device comprises a first cluster, such as cluster 10A, disposed in a data storage and retrieval system, such as system 100. In certain embodiments, the first data storage device comprises a first RAID rank, such as RAID rank 180 (FIG. 1).

In the illustrated embodiment of FIG. 3, computer 390 provides the first information to data storage device 301 via communication link 398. In certain embodiments, data storage device 301 comprises all or part of an data storage and retrieval system, such as system 100.

In certain embodiments, communication link 398 is selected from a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, step 520 further includes providing the first information to an I/O adapter, such as host adapter 302. In certain embodiments, step 520 is performed by computer 390. In certain embodiments, step 520 is performed by a controller disposed in computer 390, such as controller 392.

In certain embodiments, Applicants' method includes step 522 wherein Applicants' method determines if the first information must be synchronously copied to two or more information storage media. In certain embodiments, step 522 is performed by computer 390. In certain embodiments, step 522 is performed by controller 392.

If Applicants' method determines in step 522 that the first information must be synchronously copied to two or more information storage media, then Applicants' method transitions from step 522 to step 524 wherein Applicants' method generates a write command comprising a synchronous copy attribute. In certain embodiments, step 524 includes setting a synchronous copy bit. In certain embodiments, step 524 includes setting a synchronous copy flag. Applicants' method transitions from step 524 to step 530. In certain embodiments, step 524 is performed by computer 390. In certain embodiments, step 524 is performed by controller 392.

In certain embodiments, if Applicants' method determines in step 522 that the first information need not be synchronously copied to two or more information storage media, then Applicants' method transitions from step 522 to step 526 wherein Applicants' method generates a write command comprising an asynchronous copy attribute. In certain embodiments, step 526 includes setting an asynchronous copy bit. In certain embodiments, step 526 includes setting an asynchronous copy flag. In certain embodiments, Applicants' method generates a write command in step 526 that includes no copy attribute. In certain embodiments, step 526 is performed by computer 390. In certain embodiments, step 526 is performed by controller 392. Applicants' method transitions from step 526 to step 530.

In step 530, Applicants' method provides a write command to the first data storage device. In certain embodiments, step 530 is performed by computer 390. In certain embodiments, step 530 is performed by a controller disposed in computer 390, such as controller 392. In certain embodiments, step 520 is performed prior to step 530. In certain embodiments, step 530 is performed prior to step 520. In certain embodiments, steps 520 and 530 are performed substantially synchronously.

In step 540, Applicants' method, at a first write time, writes the first information to a first information storage medium disposed in the first data storage device. In certain embodiments, that first information storage medium comprises a data cache, such as cache 332. In certain embodiments, that first information storage medium comprises non-volatile storage ("NVS"), such as NVS 362. In certain embodiments, step 540 is performed by processor 332.

In step 550, Applicants' method determines if the write command comprises a synchronous copy attribute. In certain embodiments, step 540 is performed prior to step 550. In certain embodiments, steps 540 and 550 are performed substantially synchronously. In certain embodiments, step 550 is performed by the first data storage device, such as data storage device 301. In the certain embodiments, step 550 is performed by a PPRC manager, such as PPRC manager 340. In certain embodiments, step 550 is performed by a PPRC controller, such as PPRC controller 342.

If Applicants' method determines in step 550 that the write command of step 530 comprises a synchronous copy attribute, then Applicants' method transitions from step 550 to step 555 wherein Applicants' method synchronously provides the first information to a second data storage device, such as data storage device 401. In certain embodiments, the second data storage device comprises a second data storage and retrieval system, such as system 100. In certain embodiments, the second data storage device comprises a second cluster, such as cluster 101B, disposed in a first data storage and retrieval system.

In certain embodiments, the second data storage device is selected by the host computer, such as computer 390. In certain embodiments, the second data storage device is selected by a controller, such as controller 392, disposed in computer 390. In certain embodiments, the second data storage device is selected by the first PPRC manager, such as PPRC manager 340. In certain embodiments, the second data storage device is selected by a controller, such as controller 342, disposed in PPRC manager 340. In certain embodiments, the second data storage device is determined by programmable logic disposed in PPRC manager 340, such as, for example, computer useable medium 344 having computer readable program code disposed therein. In certain embodiments, the second data storage device is determined by A computer code product, such as computer code product 346, disposed in PPRC manager 340.

In the illustrated embodiment, the first information is provided to second data storage device 401 using communication link 399. In certain embodiments, communication link 399 is selected from a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

By "synchronously providing," Applicants' mean immediately providing the first information to the second data storage device. In certain embodiments, step 555 includes providing the first information to the second data storage device while that first information is being written to the first information storage medium.

In certain embodiments, step 555 is performed by the first PPRC manager, such as PPRC manager 340. In certain embodiments, step 555 is performed by a controller, such as controller 342, disposed in PPRC manager 340. In certain embodiments, step 555 further includes providing the first information to a second host adapter, such as adapter 310, and a third host adapter, such as adapter 402.

Applicants' method transitions from step 555 to step 565 wherein Applicants' method begins writing the first information to a second information storage medium disposed in the second data storage device. In certain embodiments, that second information storage medium comprises a data cache, such as cache 432. In certain embodiments, that second information storage medium comprises non-volatile storage ("NVS"), such as NVS 462. In certain embodiments, step 565 is performed by processor 432. In certain embodiments, steps 540 and 565 are performed at the first write time.

Figure 4B:
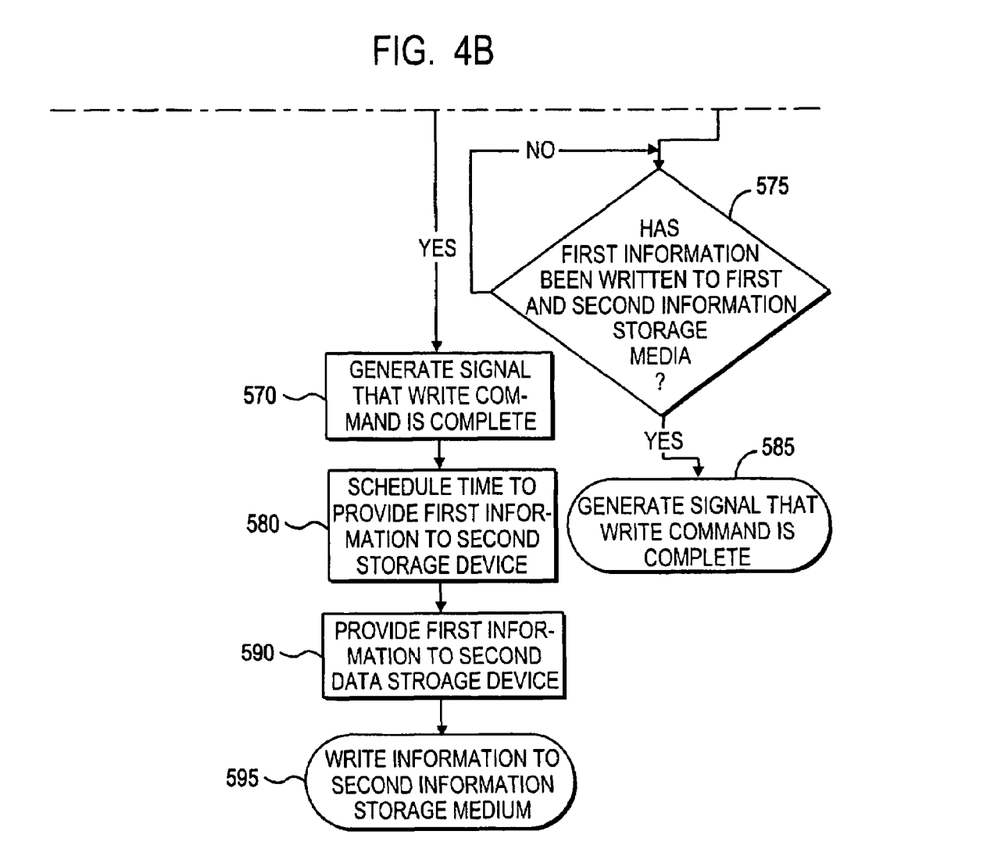
FIG. 4B is a flow chart summarizing additional steps in Applicants' method.

Referring now to FIG. 4B, in step 575 Applicants' method determines if the first information has been written to both the first information storage medium and to the second information storage medium. In certain embodiments, step 575 is performed by processor 332. In certain embodiments, step 575 is performed by processor 432. In certain embodiments, step 575 is performed by PPRC controller 342. In certain embodiments, step 575 is performed by PPRC controller 442. In certain embodiments, step 575 is performed by a combination of one or more of PPRC controller 342, PPRC controller 442, processor 332, and/or processor 432.

If Applicants' method determines in step 575 that the first information has not been written to both the first information storage medium and to the second information storage medium, then Applicants' method continues to monitor the status of the writing of the first information to the first information storage medium and to the second information storage medium. If Applicants' method determines in step 575 that the first information has been written to both the first information storage medium and to the second information storage medium, then Applicants' method transitions from step 575 to step 585 wherein Applicants' method generates a signal that the write command is complete.

In certain embodiments, step 585 further includes providing that write complete signal to computer 390. In these embodiments, the write complete signal of step 585 is provided to computer 390 at a synchronous write complete time.

In certain embodiments, step 585 is performed by processor 332. In certain embodiments, step 585 is performed by processor 432. In certain embodiments, step 585 is performed by PPRC manager 340. In certain embodiments, step 585 is performed by PPRC controller 342. In certain embodiments, step 585 is performed by PPRC manager 440. In certain embodiments, step 585 is performed by PPRC controller 442. In certain embodiments, step 585 is performed by a combination of one or more of PPRC manager 340, PPRC controller 342, PPRC manager 440, PPRC controller 442, processor 332, and/or processor 432.

Referring now to FIGS. 4A and 4B, if Applicants' method determines in step 550 that the write command of step 530 does not comprise a synchronous copy attribute, then Applicants' method transitions from step 550 to step 560 wherein Applicants' method determines if the first information has been written to the first information storage medium. If Applicants' method determines in step 560 that the first information has not been written to the first information storage medium, then Applicants' method continues to monitor the writing of the first information to the first information storage medium.

If Applicants' method determines in step 560 that the first information has been written to the first information storage medium, then Applicants' method transitions from step 560 to step 570 wherein Applicants' method generates a signal that the write command is complete. In certain embodiments, step 570 is performed by processor 332. In certain embodiments, step 570 is performed by PPRC manager 340. In certain embodiments, step 570 is performed by PPRC controller 342.

In certain embodiments, step 570 further includes providing the write command complete signal to computer 390. In these embodiments, the write complete signal of step 570 is provided to computer 390 at an asynchronous write complete time. In certain embodiments, the write command complete signal is provided to computer 390 by a host adapter, such as adapter 302.

In step 580, Applicants' method schedules the first information for later transmission to a second data storage device. In certain embodiments, step 580 is performed by processor 332. In certain embodiments, step 580 is performed by PPRC manager 340. In certain embodiments, step 580 is performed by PPRC controller 342. In certain embodiments, the time to provide the first information to the second data storage device is disposed in programmable logic, such as logic 344. In certain embodiments, the time to provide the first information to the second data storage device is disposed in firmware, such as firmware 346.

In step 590, Applicants' method provides the first information to a second data storage device. In certain embodiments, the second data storage device comprises a second data storage and retrieval system, such as system 100. In certain embodiments, the second data storage device comprises a second cluster in the same data storage and retrieval system, such as cluster 101B. In the illustrated embodiment of FIG. 3, the second data storage device comprises assembly 401.

In certain embodiments, the second data storage device is selected in step 590 by the host computer, such as computer 390. In certain embodiments, the second data storage device is selected in step 590 by a controller, such as controller 392, disposed in computer 390. In certain embodiments, the second data storage device is selected in step 590 by the first PPRC manager, such as PPRC manager 340. In certain embodiments, the second data storage device is selected in step 590 by a controller, such as controller 342, disposed in PPRC manager 340. In certain embodiments, the second data storage device is determined by programmable logic, such as logic 344, disposed in PPRC manager 340. In certain embodiments, the second data storage device is determined by firmware, such as firmware 346, disposed in PPRC manager 340.

In the illustrated embodiment, step 590 includes providing the first information to second data storage device 401 using communication link 399. In certain embodiments, communication link 399 is selected from a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, step 590 is performed by a data storage and retrieval system processor, such as processor 332. In certain embodiments, step 590 is performed by a PPRC manager, such as PPRC manager 340. In certain embodiments, step 590 is performed by a PPRC controller, such as controller 342.

In step 595, Applicants' method writes the first information to a second information storage medium at a second write time, where that second write time is later than the first write time of step 540 and where that second write time is later that the asynchronous write complete time of step 570. In certain embodiments, that second information storage medium comprises a data cache, such as cache 432. In certain embodiments, that second information storage medium comprises non-volatile storage ("NVS"), such as NVS 462. In certain embodiments, step 565 is performed by processor 432. In certain embodiments, step 595 is performed by a data storage device processor, such as processor 432.

In certain embodiments, individual steps recited in FIGS. 4A and/or 4B may be combined, eliminated, or reordered.

Applicants' invention further includes an article of manufacture comprising a computer useable medium, such as for example computer useable media 344 and/or 444, having computer readable program code disposed therein method to copy information to two or more information storage media. In certain embodiments, the article of manufacture comprises a data storage and retrieval system. In certain embodiments, the article of manufacture comprises a PPRC copy manager. In certain embodiments, the computer readable program code implements the steps of FIGS. 4A and 4B.

Applicants' invention further includes a computer program product, such as for example computer program product 346 and/or 446, usable with a programmable computer processor having computer readable program code embodied therein method to provide information to two or more information storage media. In certain embodiments, the computer program product is disposed in a data storage and retrieval system. In certain embodiments, the computer program product is disposed in a processor disposed in a data storage and retrieval system. In certain embodiments, the computer program product is disposed in a PPRC manager. In certain embodiments, the computer program code implements the steps of FIGS. 4A and 4B.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide information to multiple data storage devices, comprising the steps of:
   providing a computer comprising memory;
   providing a first data storage device comprising a first information storage medium and a second data storage device comprising a second information storage medium, wherein said first data storage device is capable of communicating with said second data storage device;
   generating one or more computer files by said computer
   saving said one or more computer files in said memory;
   providing a least recently used protocol, wherein one or more of the least recently used files are written to one or more data storage devices;
   determining using said least recently used protocol if said one or more computer files should be written to one or more information storage media;
   operative if said one or more computer files should be written to one or more information storage media:
   providing said one or more computer files to said first data storage device and synchronously providing said first information to said second data storage device;
   writing said one or more computer files to said first information storage medium;
   writing said one or more computer files to said second information storage medium;
   providing a first write complete signal indicating that said one or more compute files have been written to said first information storage medium and to said second information storage medium;
   operative if said one or more computer files must not be synchronously written to multiple information storage media:
   writing said one or more computer files to said first information storage medium;
   determining if said one or more computer files has been written to said first information storage medium;
   operative if said first information has been written to said first information storage medium, generating a second write complete signal indicating that said one or more compute files have been written to said first information storage medium.

2. The method of claim 1, wherein said one or more computer files are provided to said first data storage device by a host computer, further comprising the step of providing second write complete signal to said host computer.

3. The method of claim 1, wherein said one or more computer files must not be synchronously written to multiple information storage media, further comprising the steps of:
   scheduling the transmission of said one or more computer files to said second data storage device;
   providing said one or more computer files to said second information storage device;
   writing said one or more computer files to said second information storage medium.

4. An article of manufacture comprising a processor, a memory, a least recently used protocol wherein one or more of the least recently used files are written to one or more data storage devices, and computer readable medium having computer readable program code disposed therein to provide information from a first data storage device comprising a first information storage medium to a second data storage device comprising a second information storage medium, the computer readable program code comprising a series of computer readable program instructions which cause said processor to carry out a process comprising the steps of:
   generating one or more computer files;
   saving said one or more computer files in said memory;
   determining using said least recently used protocol if said one or more computer files should be written to one or more information storage media;
   operative if said one or more computer files should be written to one or more information storage media:
   providing said one or more computer files to said first data storage device and synchronously providing said one or more computer files to said second data storage device;
   writing said one or more computer files to said first information storage medium;
   writing said one or more computer files to said second information storage medium;
   providing a first write complete signal indicating that said one or more compute files have been written to said first information storage medium and to said second information storage medium;
   operative if said one or more computer files must not be synchronously written to multiple information storage media:
   writing said one or more computer files to said first information storage medium;
   determining if said one or more computer files has been written to said first information storage medium;
   operative if said first information has been written to said first information storage medium, generating a second write complete signal indicating that said one or more compute files have been written to said first information storage medium.

5. The article of manufacture of claim 4, said computer readable program code further comprising a series of computer readable program instructions which, if said one or more computer files must not be synchronously written to multiple information storage media, cause said processor to carry out a process comprising the steps of:
   scheduling the transmission of said one or more computer files to said second data storage device;
   providing said one or more computer files to said second data storage device;
   writing said one or more computer files to said second information storage medium.

6. A computer program product usable with a programmable computer processor, said product comprising a computer readable medium having computer readable program code embodied therein to provide information from a first data storage device comprising a first information storage medium to a second data storage device comprising a second information storage medium, said computer readable code comprising:
   computer readable program code which causes said programmable computer processor to save one or more computer files in a memory;
   computer readable program code which causes said programmable computer processor to determine using a least recently used protocol, wherein one or more of the least recently used files are written to one or more data storage devices, if said one or more computer files should be written to one or more information storage media;
   computer readable program code which, if said one or more computer files should be written to one or more information storage media, causes said programmable computer processor to:

provide said first information to said first data storage device and synchronously provide said first information to said second data storage device;

write said one or more computer files to said first information storage medium;

write said one or more computer files to said second information storage medium;

provide a first write complete signal indicating that said one or more compute files have been written to said first information storage medium and to said second information storage medium;

computer readable program code which, if said one or more computer files must not be synchronously written to one or more information storage media causes said programmable computer processor to:

write said one or more computer files to said first information storage medium;

determine if said one or more computer files has been written to said first information storage medium;

operative if said first information has been written to said first information storage medium, generate a second write complete signal indicating that said one or more compute files have been written to said first information storage medium.

7. The computer program product of claim 6, further comprising:

computer readable program code which, if said one or more computer files must not be synchronously written to multiple information storage media, causes said programmable computer processor to schedule the transmission of said one or more computer files to said second data storage device.

* * * * *